Patented Jan. 17, 1933                                                                                1,894,781

UNITED STATES PATENT OFFICE

EDUARD MUENCH AND FRITZ NICOLAI, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF COMPOSITIONS RESEMBLING CELLULOID

No Drawing. Application filed September 6, 1928, Serial No. 304,384, and in Germany October 12, 1927.

The present invention relates to the production of artificial compositions.

We have found that artificial compositions resembling celluloid and solutions thereof and possessing valuable properties are obtained by working neutral phosphoric esters containing at least one radicle of a primary aliphatic alcohol with more than 4 carbon atoms in its molecule and whose other esterifically combined substituents may belong to the aliphatic or hydroaromatic series together with cellulose nitrate or other cellulose esters or ethers. The resulting compositions are highly resistant to cold, they are in every respect equal in their properties to celluloid produced by means of camphor, and can therefore be classed as effective substitutes for camphor celluloid. They furnish transparent supple films, which can be prepared in the usual manner with solvents, with or without the addition of natural or artificial resins are employed in manufacture of artificial masses, lacquers or varnishes. The phosphoric esters prepared from fermentation amyl alcohol, are particularly suitable for use according to the present invention and are more suitable than the phosphoric esters of alcohols containing less than 5 carbon atoms.

The aforesaid phosphates can be employed in the manufacture of lacquers and varnishes in the place of the usual plasticizers or solvents with a slow evaporation. Accordingly solutions of cellulose esters or ethers comprising, if desired, also other softeners or plasticizing agents, gums or resins, coloring materials, fillers or several of these agents can be incorporated with the said phosphates, particularly flexible and tough films being obtained when applying the said preparations. Films of any size can be also obtained by pouring solutions of the aforesaid composition and evaporating the solvents.

The following examples will further illustrate the nature of the said invention which however is not restricted thereto. The parts are by weight.

Example 1

80 parts of triamyl phosphate boiling at from 143 to 144 degrees C. under 2.5 millimeters pressure and prepared, for example, from fermentation amyl alcohol and phosphorous oxy-chlorid and 240 parts of nitrocellulose, are made into a plastic mass by any known or suitable means. The resulting compound is a colorless and inodorous product resembling celluloid possessing valuable properties.

Example 2

100 parts of cellulose nitrate are dissolved in a mixture consisting of 300 parts of butyl acetate, 100 parts of glycol monoethylether and 400 parts of toluene whereupon 30 parts of tri-isoamyl phosphate are added. An excellent lacquer is obtained which can be further improved by an addition of 20 parts of ester gum. In the place of tri-isoamyl phosphate di-isoamyl butyl phosphate with the boiling point of 121 to 122° C. at 1.5 millimeters pressure (mercury) or di-ethyl isoamyl phosphate with a boiling point of 84 to 85° C. at 2 millimeters, can be employed.

What we claim is:

1. A composition of matter comprising a cellulose ester and a neutral phosphoric ester containing three radicles of primary aliphatic alcohols containing more than 4 carbon atoms in their molecule.

2. A composition of matter comprising a cellulose ester and triamyl phosphate.

3. A composition of matter comprising cellulose nitrate and triamyl phosphate.

4. A composition of matter comprising cellulose nitrate and about one third its weight of triamyl phosphate.

5. A composition of matter comprising a cellulose ester, triamyl phosphate and a coloring matter.

6. A composition of matter comprising a cellulose ester, triamyl phosphate and a gum.

7. A composition of matter comprising a cellulose ester, triamyl phosphate and a dissolving matter compatible with the aforesaid compounds.

8. A composition of matter comprising a cellulose ester, triamyl phosphate, a gum and a coloring matter.

9. A composition of matter comprising a cellulose ester, triamyl phosphate, a gum and a dissolving matter compatible with the aforesaid compounds.

10. A composition of matter comprising a cellulose ester, triamyl phosphate, a gum, a coloring matter and a dissolving matter compatible with the aforesaid compounds.

In testimony whereof we have hereunto set our hands.

EDUARD MUENCH.
FRITZ NICOLAI.